(12) United States Patent
Wang et al.

(10) Patent No.: US 12,272,022 B2
(45) Date of Patent: Apr. 8, 2025

(54) FRAME SEQUENCE QUALITY BOOSTER UNDER UNEVEN QUALITY CONDITIONS

(71) Applicant: MediaTek Inc., Hsinchu (TW)

(72) Inventors: Yao-Sheng Wang, Hsinchu (TW); Pei-Kuei Tsung, Hsinchu (TW); Chiung-Fu Chen, Hsinchu (TW); Wai Mun Wong, Singapore (SG); Chao-Min Chang, Hsinchu (TW); Yu-Sheng Lin, Hsinchu (TW); Chiani Lu, Hsinchu (TW); Chih-Cheng Chen, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 419 days.

(21) Appl. No.: 17/894,947

(22) Filed: Aug. 24, 2022

(65) Prior Publication Data

US 2023/0067568 A1 Mar. 2, 2023

Related U.S. Application Data

(60) Provisional application No. 63/273,168, filed on Oct. 29, 2021, provisional application No. 63/244,297, filed on Sep. 15, 2021, provisional application No. 63/237,242, filed on Aug. 26, 2021.

(51) Int. Cl.
*G06T 3/4053* (2024.01)
*G06T 5/77* (2024.01)
*G06T 7/00* (2017.01)
*G06T 7/20* (2017.01)
*G06T 7/30* (2017.01)

(52) U.S. Cl.
CPC ........... *G06T 3/4053* (2013.01); *G06T 5/77* (2024.01); *G06T 7/0002* (2013.01); *G06T 7/20* (2013.01); *G06T 7/30* (2017.01); *G06T 2207/10016* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 9,240,070 B2 * | 1/2016 | Anderson-Sprecher | ..................... G06T 15/005 |
| 9,262,806 B2 * | 2/2016 | Gevrekci | ................... G06T 7/20 |
| 9,300,869 B2 * | 3/2016 | Marvit | ................. H04N 23/951 |
| 11,632,498 B1 * | 4/2023 | Mowry | .................. G03B 17/48 348/222.1 |
| 11,785,351 B1 * | 10/2023 | Mowry | ..................... G06T 7/74 348/222.1 |
| 2006/0104346 A1 * | 5/2006 | Li | ......................... H04N 19/152 375/E7.184 |

(Continued)

FOREIGN PATENT DOCUMENTS

WO 2006080655 A1 8/2006

*Primary Examiner* — Anand P Bhatnagar
(74) *Attorney, Agent, or Firm* — Tong J. Lee (57) ABSTRACT

The quality of a frame sequence is enhanced by a booster engine collaborating with a first stage circuit. The first stage circuit adjusts the quality degradation of the frame sequence when a condition in constrained resources is detected. The quality degradation includes at least one of uneven resolution and uneven frame per second (FPS). The booster engine receives the frame sequence from the first stage circuit, and generates an enhanced frame sequence based on the frame sequence for transmission to a second stage circuit.

20 Claims, 7 Drawing Sheets

(56) References Cited

U.S. PATENT DOCUMENTS

| | | | |
|---|---|---|---|
| 2009/0080854 A1* | 3/2009 | Arai | H04N 9/8042 |
| | | | 386/280 |
| 2015/0296188 A1* | 10/2015 | Meganathan | G08B 13/19682 |
| | | | 348/143 |
| 2016/0277645 A1* | 9/2016 | Bitouk | G06T 7/246 |
| 2018/0176574 A1 | 6/2018 | Tang | |

* cited by examiner

FRAME SEQUENCE QUALITY BOOSTER UNDER UNEVEN QUALITY CONDITIONS

CROSS-REFERENCE TO RELATED APPLICATIONS

This application claims the benefit of U.S. Provisional Application No. 63/237,242 filed on Aug. 26, 2021, U.S. Provisional Application No. 63/244,297 filed on Sep. 15, 2021, and U.S. Provisional Application No. 63/273,168 filed on Oct. 29, 2021, the entirety of all of which is incorporated herein by reference.

TECHNICAL FIELD

Embodiments of the invention relate to image and video processing for frame quality enhancement.

BACKGROUND

A typical edge electronic device, such as a television, a smartphone, a wearable device, a portable computing device, a gaming device, etc., has limited computing power due to strict requirements on power consumption and thermal performance. Graphics rendering operations on an edge device generally incur a significant amount of graphics processing unit (GPU) workload. To maintain a target frame rate for smooth image display, the edge device may suffer from high power consumption. Sometimes the target frame rate is unachievable due to various resource constraints, such as high computation workload and power consumption limits. Thus, there is a need for improving image processing techniques to minimize the impact of resource constraints on frame quality.

SUMMARY

In one embodiment, a method is provided for enhancing the quality of a frame sequence. The method comprises a first stage circuit adjusting quality degradation of the frame sequence when a condition in constrained resources is detected. The quality degradation includes at least one of uneven resolution and uneven frame per second (FPS). The method further comprises a booster engine receiving the frame sequence from the first stage circuit, and generating an enhanced frame sequence based on the frame sequence for transmission to a second stage circuit.

In another embodiment, a system is operative to enhance the quality of a frame sequence. The system comprises a first stage circuit to adjust the quality degradation of the frame sequence when a condition in constrained resources is detected. The quality degradation includes at least one of uneven resolution and uneven FPS. The system further includes a booster engine to receive the frame sequence from the first stage circuit, and to generate an enhanced frame sequence based on the frame sequence for transmission to a second stage circuit.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Figure 1:
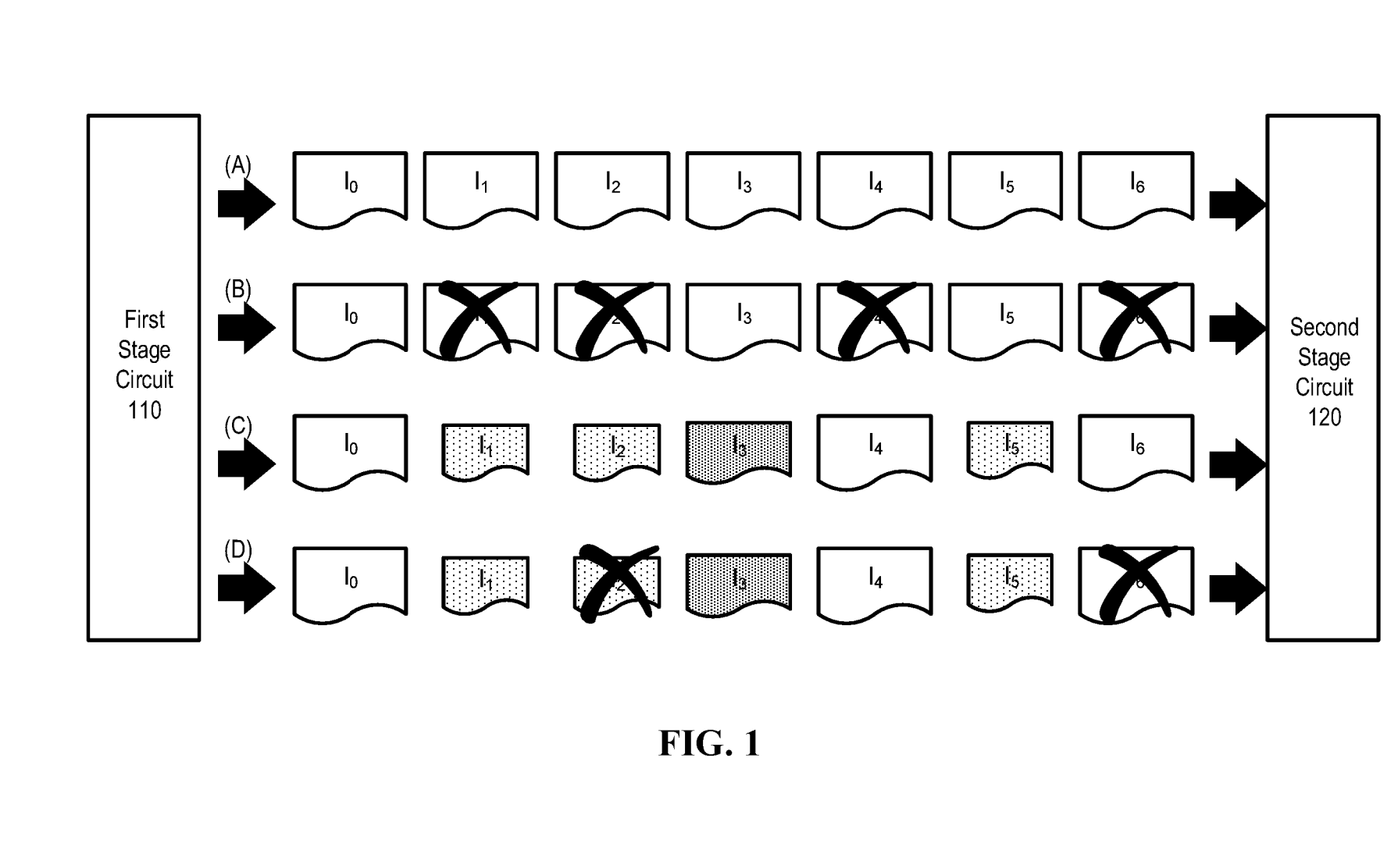
FIG. 1 illustrates a number of frame sequence examples according to some embodiments.

FIG. 1 illustrates a number of frame sequence examples according to some embodiments. A first stage circuit 110 transmits a frame sequence to a second stage circuit 120. The quality of the frame sequence may sometimes be unstable; that is, from time to time the frame rate of the frame sequence may be lower than a target frame per second (FPS), and some frames in the frame sequence may have lower resolution than others. The first stage circuit 110 may output any of the frame sequences shown in the following non-limiting examples. Row (A) shows a frame sequence with even quality in which all frames ($I_0$-$I_6$) are generated by the first stage circuit 110 at a target FPS and at a target resolution. Row (B) shows an uneven FPS condition in which frames $I_1$, $I_2$, $I_4$, and $I_6$ are lost in transmission or not generated (e.g., not rendered) by the first stage circuit 110. In a frame sequence with an uneven FPS condition, the frame rate (also referred to as the FPS) is dynamically changing without following a regular pattern.

Row (C) shows an uneven resolution condition in which frames $I_0$, $I_4$, and $I_6$ have the target resolution (e.g., 2400×

1080), frame $I_3$ has a resolution (e.g., 1600×720) lower than the target resolution, and frames $I_1$, $I_2$, and Is have the lowest resolution (e.g., 600×270) in the frame sequence.

In a frame sequence with an uneven resolution, the resolution of the frames is dynamically changing without following a regular pattern. Row (D) shows a combination of uneven FPS and uneven resolution conditions. Rows (B), (C), and (D) provide non-limiting examples of a frame sequence with an uneven quality condition. It is understood that a frame sequence with an uneven quality condition may have any combination of uneven FPS and uneven resolution, including having uneven FPS only or uneven resolution only. Although the examples herein show uneven quality conditions, it is understood that the first stage circuit 110 may also transmit a frame sequence with even quality degradation, e.g., a frame sequence in which every other frame is missing or low resolution.

In the following description, a frame sequence with an uneven quality condition may also be referred to as a frame sequence having quality degradation in multiple frames that are unevenly spaced in time. In the example of row (B), the missing frames $I_1$, $I_2$, $I_4$, and $I_6$ are unevenly spaced in time, where the spacing is one frame interval between $I_1$ and $I_2$, two frame intervals between $I_2$ and $I_4$, and two frame intervals between $I_4$ and $I_6$. Similarly, in the examples of rows (C) and (D), the missing and/or low-resolution frames are unevenly spaced in time. Thus, it should be understood that the term "uneven" hereinafter can be interpreted as "non-uniform across a frame sequence".

The first stage circuit 110 may determine or be requested to generate a frame sequence with an uneven quality condition due to resource constraints. Non-limiting examples of resource constraints include insufficient transmission bandwidth, high computation workload, power consumption limit, etc. In one embodiment, the first stage circuit 110 may reduce the quality of those frames with low or slow-changing information contents. Alternatively or additionally, the first stage circuit 110 may reduce the quality of one or more frames when a constrained resource has exceeded its usage threshold; e.g., when the power consumption exceeds a threshold. A quantity may be "insufficient", "high", "slow", or "low" when it is compared to a predetermined threshold value. In one embodiment, the first stage circuit may use a host circuit or run a background thread to monitor the usage of constrained resources. When the host circuit or the thread detects that a constrained resource usage exceeds a threshold, it notifies the first stage circuit to adjust the quality degradation of the frame sequence. Such quality degradation may include one or both of uneven resolution and uneven FPS. Non-limiting examples of constrained resources include one or more of computational resources, power resources, and transmission bandwidth.

The first stage circuit 110 and second stage circuit 120 may be any two endpoints of a frame sequence propagation network or connection. In one embodiment, the first stage circuit 110 and the second stage circuit 120 may be located in the same electronic device, such as a graphics processing unit (GPU) and a display panel in the same device. In another embodiment, the first stage circuit 110 and the second stage circuit 120 may be located in different devices such as a transmitter (Tx) device and a receiver (Rx) device connected by a transmission network.

The first stage circuit 110 can dynamically adjust the frame quality, during rendering and/or transmission, to produce a frame sequence with an uneven quality condition. The adjustment may include temporal reduction and/or spatial reduction. Temporal reduction refers to the reduction of the FPS; e.g., reducing the number of rendered frames and/or transmitted frames per time unit. Spatial reduction refers to the reduction of the frame resolution; e.g., reducing the number of pixels in rendered and/or transmitted frames. As shown in rows (B) and (D) of FIG. 1, the temporal reduction may be uneven; e.g., the time intervals between two immediately adjacent frames may vary from time to time. Furthermore, as shown in rows (C) and (D) of FIG. 1, the spatial reduction may be uneven; e.g., the low-resolution frames may not occur at regular time intervals.

The uneven quality condition in a frame sequence, such as FPS reduction and/or resolution reduction, can save a significant amount of computation, bandwidth, and/or power resources of the first stage circuit 110. The first stage circuit 110 can adjust the quality reduction with great flexibility to achieve a balanced and smooth trade-off between frame quality and resource usage.

As will be described in further detail later, the disclosed system further includes a booster engine to recover from the quality reduction of the frame sequence. The booster engine may be activated on demand. In one embodiment, the booster engine receives a frame sequence from the first stage circuit, enhances the frame quality, and sends the enhanced frame sequence to the second stage circuit. The frame sequence may have an uneven quality condition or an even quality condition. In an embodiment where the booster engine is co-located with the first stage circuit such as a GPU, the booster engine can offload the rendering operations from the GPU. The offloading of the rendering operations may enable the system to increase the FPS with acceptable power consumption. In another embodiment where the booster engine is at the Rx device of a transmission network, the booster engine may serve as a stabilizer to stabilize the frame quality received by the Rx device.

Figure 2:
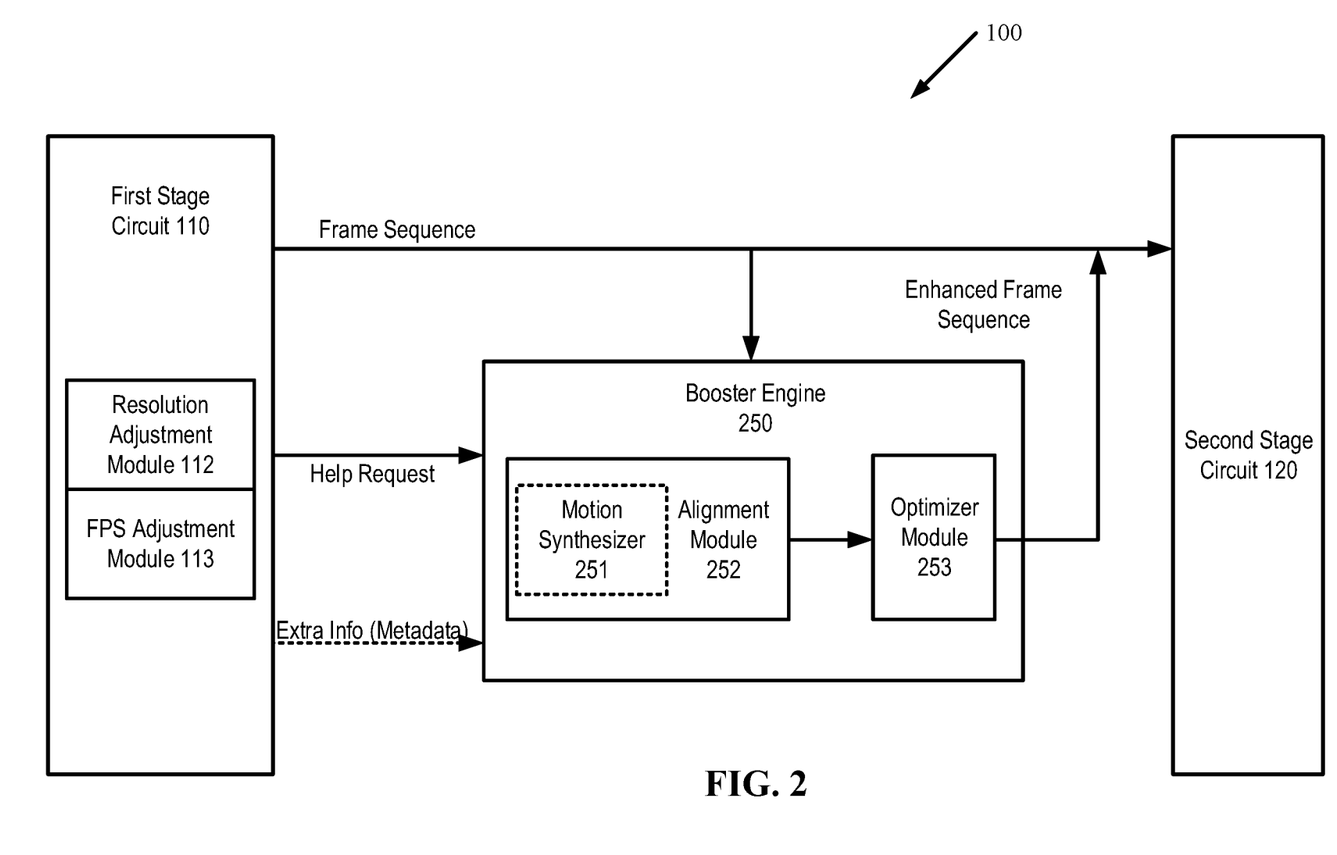
FIG. 2 is a block diagram illustrating a system for boosting the quality of a frame sequence according to one embodiment.

FIG. 2 is a block diagram illustrating a system 100 for boosting the quality of a frame sequence according to one embodiment. The elements indicated by dotted lines represent those elements that may be absent in some alternative embodiments. The system 100 includes the first stage circuit 110 coupled to the second stage circuit 120 via an electrical connection (e.g., a bus connection) or a transmission network connection. A booster engine 250 is coupled to a connection and is operative to enhance the quality of a frame sequence transmitted from the first stage circuit 110 to the second stage circuit 120. The booster engine 250 may be a special-purpose hardware circuit. Alternatively, the booster engine 250 may be software containing instructions executable by a processor, or a combination of both hardware circuit and software instructions. The frame quality enhancement performed by the booster engine 250 may include super-resolution, frame interpolation and/or extrapolation, inpainting, image alignment, motion synthesis, etc.

In one embodiment, the first stage circuit 110 includes a resolution adjustment module 112 and an FPS adjustment module 113. The first stage circuit 110 dynamically adjusts the frame quality using the resolution adjustment module 112 to generate low-resolution frames and/or the FPS adjustment module 113 to change the frame rate. In one embodiment, the system 100 may also include a host processor (not shown) that controls the operations of the first stage circuit 110. The system 100 monitors the system resource usage such as computational resource utilization, power consumption, transmission bandwidth utilization, etc. When a resource usage reaches a limit, the first stage circuit 110 or the host processor activates one or both of the resolution adjustment module 112 and the FPS adjustment module 113 to adjust (e.g., reduce) the output frame quality. The adjustment may be made as needed, e.g., the reduction in resolution and/or frame rate may be made to any frames at any time intervals. One or both of the resolution adjustment module 112 and an FPS adjustment module 113 may be implemented by special-purpose hardware circuits, software containing instructions executable by a processor, or a combination of hardware circuits and software instructions. In one embodiment, both the resolution adjustment module 112 and the FPS adjustment module 113 may be part of a GPU rendering pipeline.

In one embodiment, the first stage circuit 110 may generate extra information including metadata regarding low-resolution frames and missing frames, and send the extra information to the booster engine 250. For example, the first stage circuit 110 may render frame (N), but skip rendering frame (N+1) or render frame (N+1) in low resolution. To help the booster engine 250 to improve the frame quality, the first stage circuit 110 may generate the metadata describing the properties of frame (N+1) and send the metadata to the booster engine 250. The metadata may include information of frame (N+1) regarding any of the following: depth, texture, normal, color, instance segmentation, motion vector information (e.g., optical flow), frame resolution, and the like. It should be understood that the booster engine 250 may enhance the frame quality with or without the extra information from the first stage circuit 110.

In one embodiment, the first stage circuit 110 may send a help request to the booster engine 250 for frame quality enhancement. The help request may indicate the quality reduction strategy such as FPS reduction and/or resolution reduction. The help request may also provide indices of the frames having the quality reduction. For example, the help request may include a frame insertion request indicating the positions of the frames that are not rendered or not transmitted in a frame sequence. The booster engine 250 can perform motion synthesis and alignment to insert these missing frames.

In one embodiment, the booster engine 250 includes an alignment module 252 coupled to an optimization module 253. The alignment module 252 performs temporal and spatial alignment of images with respect to their respective reference frames. The alignment module 252 performs geometry transformation, frames interpolation and/or extrapolation, and other post-processing including but not limited to blending. The alignment module 252 may utilize the motion information (which may be included in the metadata) sent from the first stage circuit 110 to perform the aforementioned operations. Alternatively, the alignment module 252 may include a motion synthesizer 251 to generate the motion information. The motion synthesizer 251 can extract motion information from the frames; e.g., by generating motion vectors and optical flows between a current frame (i.e., the frame currently being processed by the booster engine 250) and a reference frame. The motion information may include an acceleration estimation of the objects in the frames.

The optimizer module 253 performs frame optimization operations including but not limited to super-resolution (SR), inpainting, blending, sharpening, and other image processing operations. In one embodiment, the optimizer module 253 may include artificial intelligence (AI) models that have been trained to perform the optimization operations. For example, the optimizer module 253 may include an AI SR model for up-scaling a low-resolution image to a higher resolution image. The optimizer module 253 may also include an AI inpainting model to repair an image with a number of missing pixels (e.g., a hole in the image). The output of the quality optimizer 253 may be sent to the second circuit 120.

One or more of the motion synthesizer 251, the alignment module 252, and the optimization module 253 in the booster engine 250 may be implemented by special-purpose hardware circuits, software containing instructions executable by a processor, or a combination of both. Depending on the information transmitted from the first stage circuit 110, platform capability, and/or the target output quality, the booster engine 250 may activate one or more of the motion synthesizer 251, the alignment module 252, and the optimization module 253 to improve the frame quality.

Figure 3:
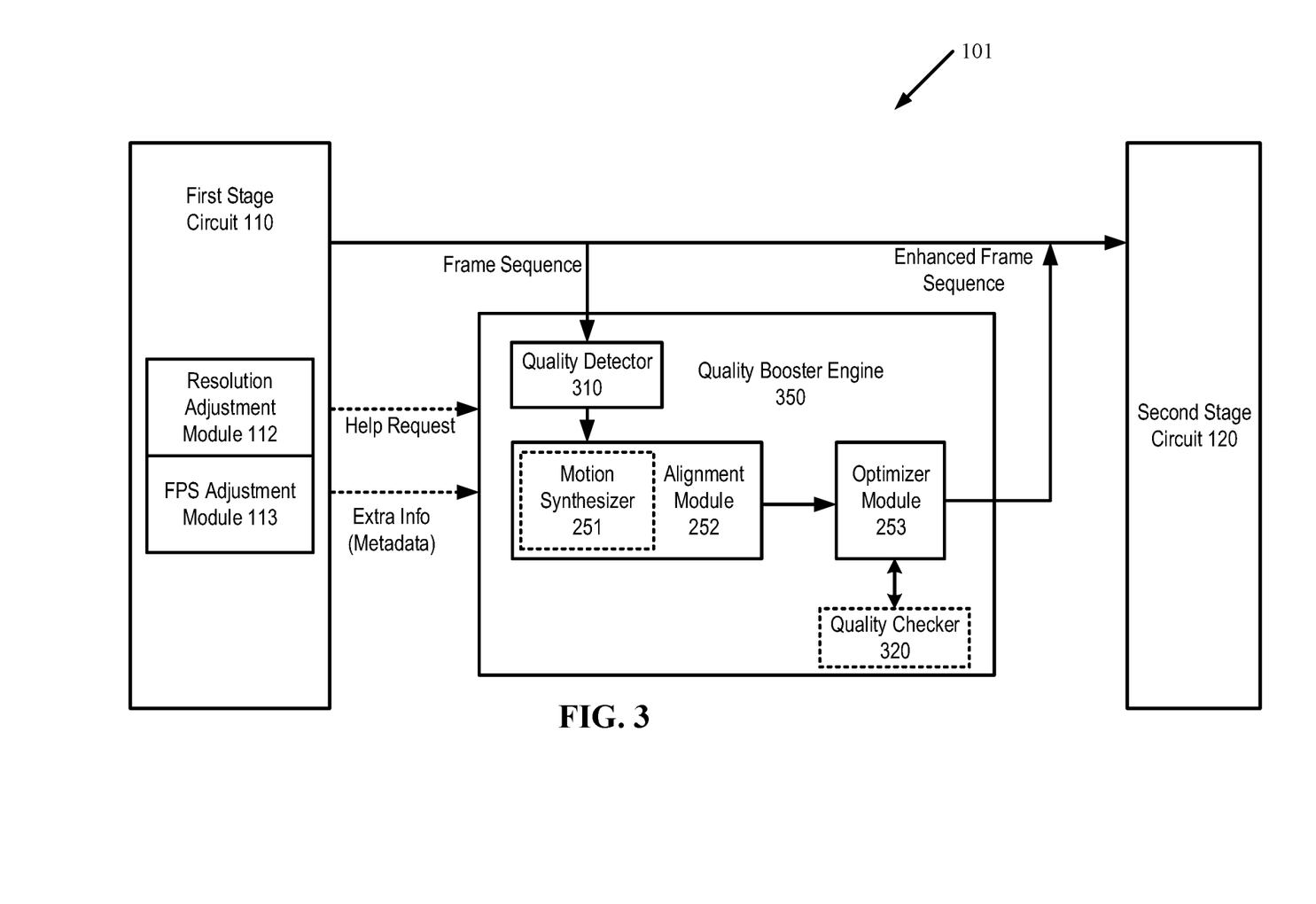
FIG. 3 is a block diagram illustrating a system for boosting the quality of a frame sequence according to another embodiment.

FIG. 3 is a block diagram illustrating a system 101 for boosting the quality of a frame sequence according to another embodiment. The elements indicated by dotted lines represent those elements that may be absent in some alternative embodiments. In one embodiment, a booster engine 350 includes a quality detector 310 that detects the quality of frames in the frame sequence transmitted from the first stage circuit 110 to the second stage circuit 120. When the quality detector 310 detects an uneven quality condition in the frame sequence; e.g., uneven FPS and/or uneven resolution, the booster engine 350 activates the alignment module 252 and the optimizer module 253 to improve the frame quality. With the quality detector 310, the help request from the first stage circuit 110 may no longer be needed.

The alignment module 252 may include the motion synthesizer 251 to generate motion information when such information is not provided by the first stage circuit 110. The operations of the motion synthesizer 251, the alignment module 252, and the optimizer module 253 have been described with reference to FIG. 2. In this embodiment, the output of the optimizer module 253 is checked by a quality checker 320, which compares the quality of a frame output from the optimizer module 253 with a quality threshold. If the frame quality does not meet the quality threshold, the output falls back to the original frame that is received by the booster engine 350. For example, the original frame may have lost too much information such that the inpainting performed by the optimizer module 253 has an unacceptable quality.

In an alternative embodiment, the booster engine 250 (FIG. 2) and/or 350 (FIG. 3) can operate to improve the frame quality without the extra information (e.g., the metadata) from the first stage circuit 110. For example, the booster engine 250/350 may calculate any of the following: depth, texture, normal, color, instance segmentation, motion vector information (e.g., optical flow), frame resolution, etc., from the received frame sequence to perform motion estimation and compensation, frame interpolation/extrapolation, alignment, super-resolution, inpainting, etc.

In an embodiment where the first stage circuit 110 does not provide the extra information or the provided extra information does not include motion information, the motion synthesizer 251 can use the information in one or more previous frames to generate optical flows for motion estimation and compensation.

Figure 4:
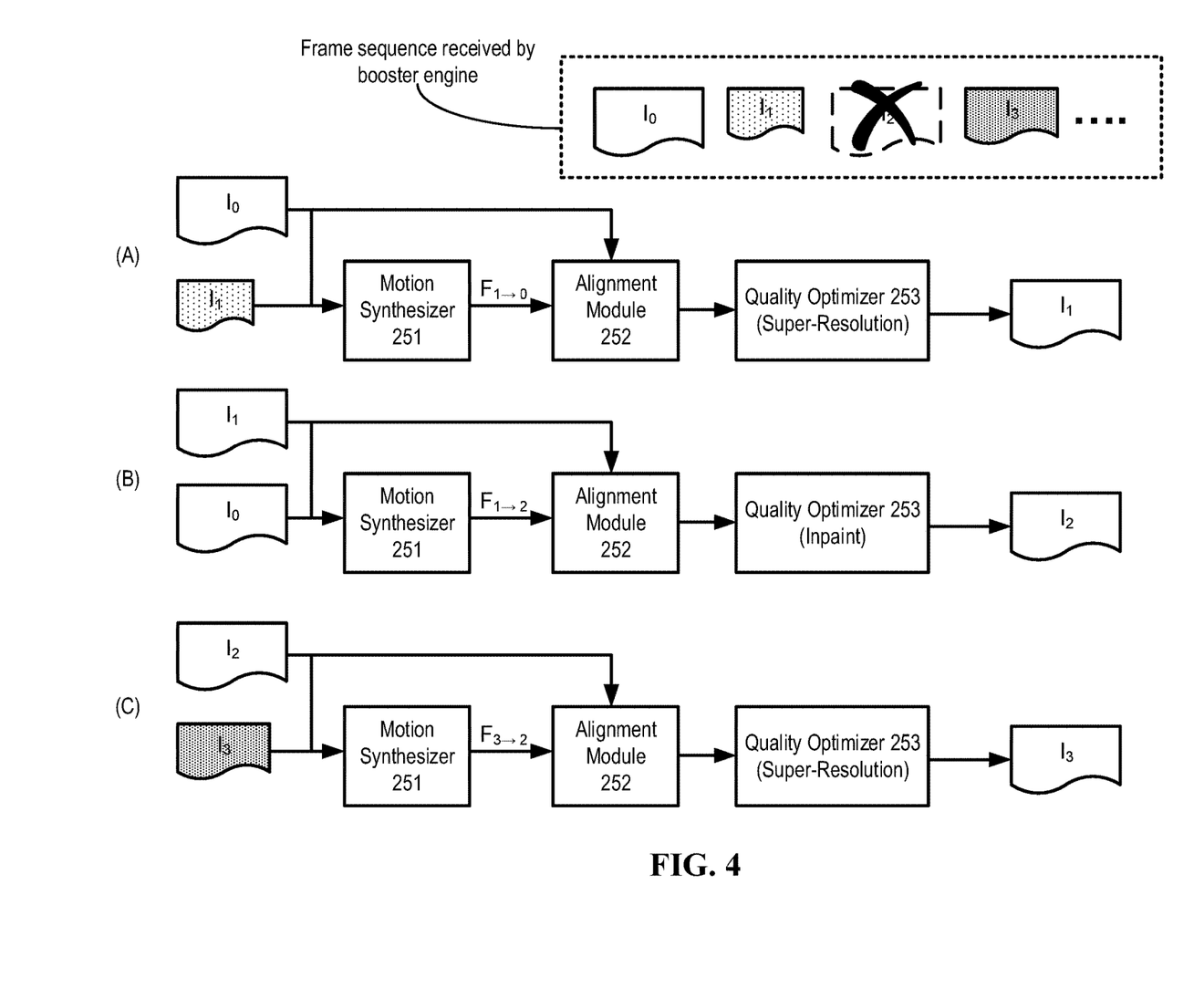
FIG. 4 is a diagram illustrating an example of booster engine operations using a previous enhanced frame as a reference frame according to one embodiment.

FIG. 4 is a diagram illustrating an example of booster engine operations using a previous enhanced frame as a reference frame according to one embodiment. This previous enhanced frame is a frame immediately preceding the current frame being processed by the booster engine. The dotted block on the top of FIG. 4 shows the frame sequence received by a booster engine (e.g., the booster engine 250 in FIG. 2 or 350 in FIG. 3). Each of rows (A), (B), and (C) shows that the motion synthesizer 251 uses one or more previous frames in the calculation of an optical flow. The alignment module 252 uses the optical flow and a previous frame (e.g., frame (N-1)) as a reference frame to generate a current frame (e.g., frame (N)). In the example of row (A), a low-resolution frame (e.g., $I_1$) is enhanced by super-resolution. In the example of row (B), the reference frame is originally a low-resolution frame (e.g., $I_1$) that is enhanced by super-resolution. In the example of row (C), the reference frame is originally a missing frame (e.g., $I_2$) that is extrapolated and inpainted from previous frames (e.g., $I_0$ and $I_1$).

Figure 5:
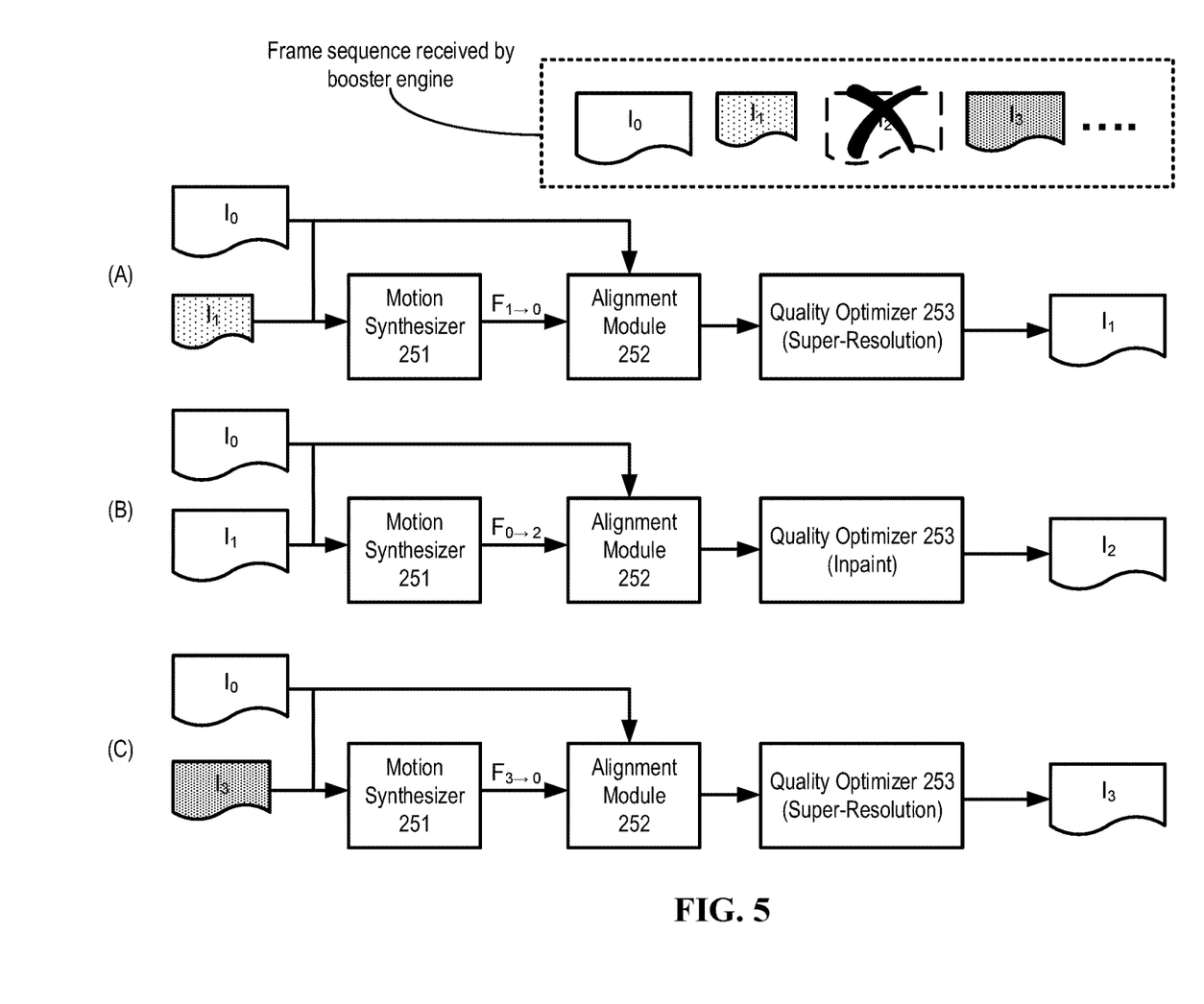
FIG. 5 is a diagram illustrating an example of booster engine operations using a previous frame having better quality than a quality standard as a reference frame according to one embodiment.

FIG. 5 is a diagram illustrating an example of booster engine operations using a previous frame having better quality than a quality standard as a reference frame according to one embodiment. This previous frame can be the best-quality frame among all of the frames preceding the current frame in the frame sequence or a segment of the frame sequence, or can be a frame having better quality than a quality threshold. The dotted block on the top of FIG. 5 shows the frame sequence received by a booster engine (e.g., the booster engine 250 in FIG. 2 or 350 in FIG. 3). Each of rows (A), (B), and (C) shows that the motion synthesizer 251 uses one or more previous frames in the calculation of an optical flow. The alignment module 252 uses the optical flow and a previous best-quality frame as a reference frame to generate a current frame (e.g., frame (N)). In this non-limiting example, frame $I_0$ is the best-quality frame in the frame sequence $I_0$-$I_3$. Thus, $I_0$ is used as the reference frame to generate $I_1$-$I_3$ with a target quality.

Figure 6:
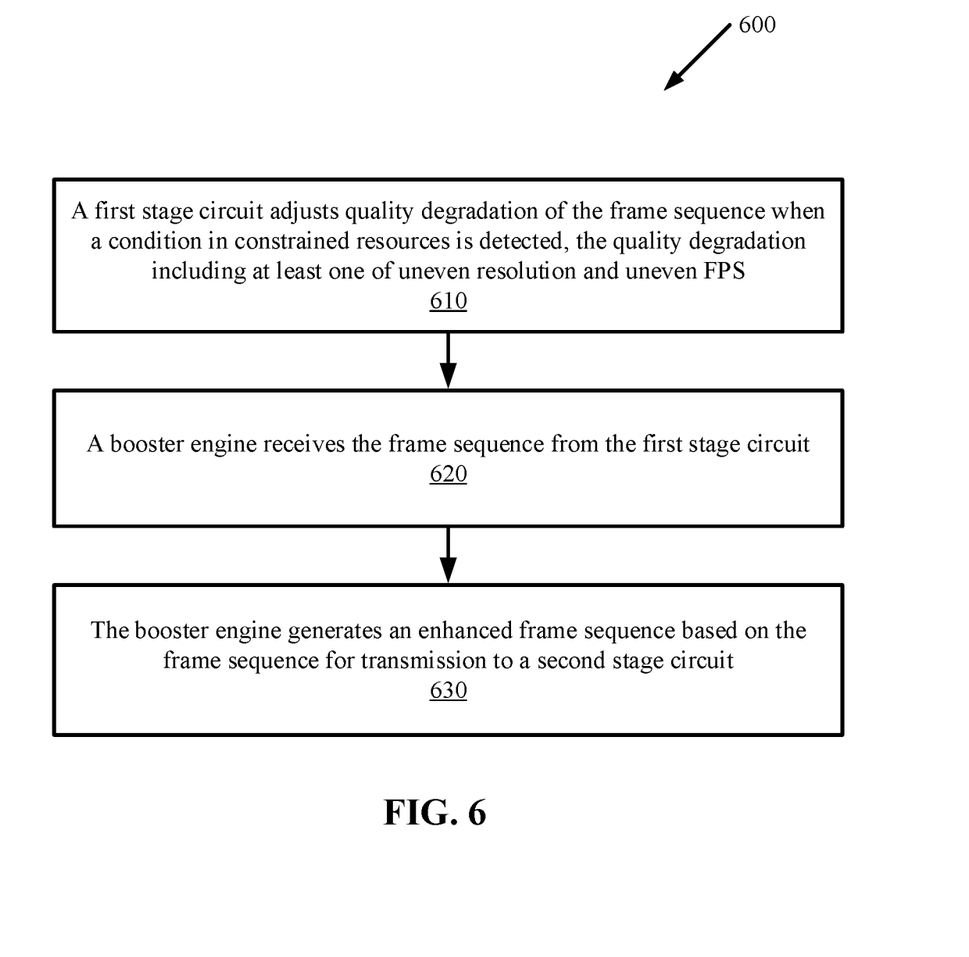
FIG. 6 is a flow diagram illustrating a method for a system to enhance frame sequence quality according to one embodiment.

FIG. 6 is a flow diagram illustrating a method 600 for a system to enhance frame sequence quality according to one embodiment. The system includes a first stage circuit and a booster engine, such as the first stage circuit 110 and the booster engine 250 or 350 in system 100 (FIG. 2) or system 101 (FIG. 3).

The method 600 begins at step 610 when the first stage circuit adjusts quality degradation of a frame sequence when a condition in constrained resources is detected. The quality degradation may include at least one of uneven frame per second (FPS) and uneven resolution. The booster engine at step 620 receives the frame sequence from the first stage circuit. The booster engine at step 630 generates an enhanced frame sequence based on the frame sequence for transmission to the second stage circuit.

In one embodiment, the booster engine may calculate an optical flow for a current frame using a frame preceding the current frame as a reference frame. Alternatively, the booster engine may calculate an optical flow for a current frame using a best-quality previous frame as a reference frame.

The first stage circuit can dynamically change the frame quality during frame sequence generation in response to resource constraints. In one embodiment, the first stage circuit may activate the booster engine by sending a help request to the booster engine, where the help request indicates the quality degradation in the frames. In response to the help request, the booster engine performs image alignment between a current frame and a reference frame, and frame quality optimization including at least super-resolution and inpainting. In another embodiment, the booster engine may detect the quality degradation in a current frame. In response to the detection, the booster engine performs image alignment between the current frame and a reference frame, and frame quality optimization including at least super-resolution and inpainting. After the quality optimization of a received frame, the booster engine compares the optimized quality with a threshold, and reverts back to the quality of the received frame when the optimized quality is below the threshold.

In one embodiment, the first stage circuit, the booster engine, and the second stage circuit are located within the same electronic device. In another embodiment, the first stage circuit and the second stage circuit are in two electronic devices coupled to each other by a transmission network.

Figure 7:
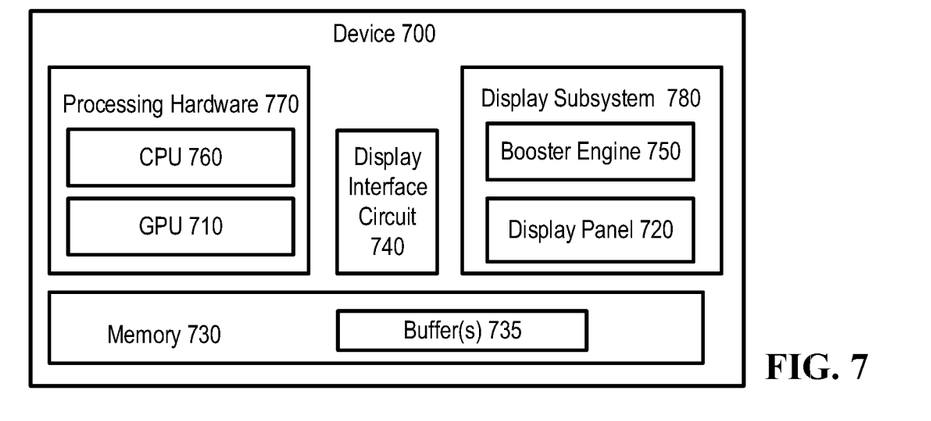
FIG. 7 illustrates an example of a device according to one embodiment.

FIG. 7 illustrates an example of a device 700 according to one embodiment. The device 700 may be a non-limiting example of the system 100 in FIG. 2 or the system 101 in FIG. 3. One example of the device 700 is an electronic device having graphics processing capabilities. For example, the device 700 may be a smartphone, a computing device, a network-connected device, a gaming device, an entertainment device, an Internet-of-things (IoT) device, or any device capable of processing and displaying images and/or videos.

The device 700 includes processing hardware 770. In one embodiment, the processing hardware 770 includes a central processing unit (CPU) 760, a GPU 710, and one or more of: a digital processing unit (DSP), an artificial intelligence (AI) processor, a multimedia processor, other general-purpose and/or special-purpose processing circuitry. In one embodiment, the GPU 710 may be the aforementioned first stage circuit 110 (FIGS. 1, 2, and 3), and the CPU 760 is a host processor for the GPU 710.

The device 700 further includes a display subsystem 780 coupled to the processing hardware 770 via a display interface circuit 740. In one embodiment, the display subsystem 780 includes a booster engine 750 and a display panel 720. The display panel 720 displays information such as images, videos, messages, games, texts, graphics, etc. In one embodiment, the display panel 720 may be the aforementioned second stage circuit 120 (FIGS. 1, 2, and 3), and the booster engine 750 may be the booster engine 250 (FIG. 2) or 350 (FIG. 3). The booster engine 750 may be part of the display subsystem 780. The booster engine 750 may be implemented by hardware, or may be implemented by program code running on a general-purpose or special-purpose processing circuit. In one embodiment, the booster engine 750 may include a hardware accelerator, such as an AI accelerator to perform frame quality optimization such as AI-based super-resolution, inpainting, and other image processing operations.

The device 700 further includes a memory 730 coupled to the processing hardware 770 and the display subsystem 780. The memory 730 may include memory devices such as dynamic random access memory (DRAM), static random access memory (SRAM), flash memory, and other non-transitory machine-readable storage media; e.g., volatile or non-volatile memory devices. The memory 730 includes one or more buffers 735, such as a color buffer, a metadata buffer, a frame buffer, etc. The GPU 710 may store rendered frames in the color buffer or the frame buffer, and store metadata in the metadata buffer, where the metadata includes information about those frames that are not rendered, and those frames having quality degradation (e.g., low resolution). In some embodiments, the memory 730 may store instructions which, when executed by the processing hardware 770, cause the processing hardware 770 to perform the method 600 of FIG. 6.

In one embodiment, the CPU 760 may set a target refresh rate of the display interface circuit 740 to control the rate at which images are output from the buffers 735 to the display panel 720, and may dynamically perform refresh-rate adjustment when there is a need. It is understood the embodiment of FIG. 7 is simplified for illustration purposes. Additional hardware components may be included. For example, the device 700 may also include a network interface to connect to a wired and/or wireless network for transmitting and/or receiving voice, digital data and/or media signals.

Figure 8:
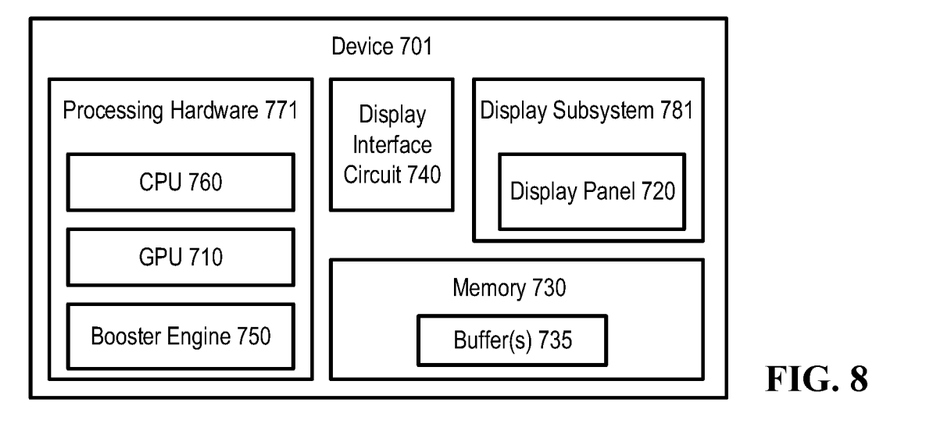
FIG. 8 illustrates an example of a device according to another embodiment.

FIG. 8 illustrates an example of a device 701 according to another embodiment. The device 701 may be a non-limiting example of the system 100 in FIG. 2 or the system 101 in FIG. 3. In FIGS. 7 and 8, the same numeral labels are used to refer to the same components.

The device 701 includes processing hardware 771 and a display subsystem 781. In this embodiment, the booster engine 750 is part of the processing hardware 771; e.g., the booster engine 750 may be a co-processor to the GPU 710, or may be implemented by program code running on a general-purpose or special-purpose processing circuit of the processing hardware 771.

In the embodiments of FIGS. 7 and 8, the GPU 710 can offload some of its rendering tasks to the booster engine 750 to achieve a smooth image display on the display panel 720. The offloading may occur in response to resource constraints such as insufficient computation capabilities or high power consumption. The offloading enables the display refresh rate to maintain at a default refresh rate (e.g., 60 FPS) or exceed the default refresh rate (e.g., 120 FPS).

Figure 9:
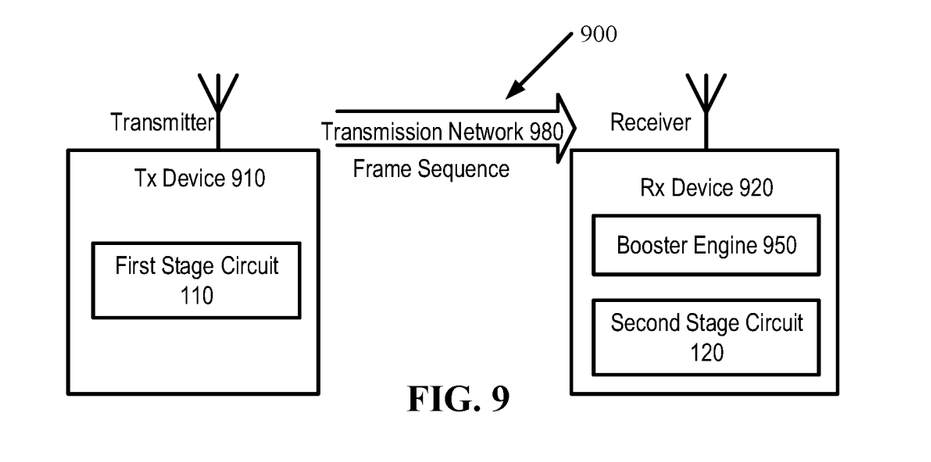
FIG. 9 illustrates an example of a system according to one embodiment.

FIG. 9 illustrates an example of a system 900 according to one embodiment. The system 900 may be a non-limiting example of the system 100 in FIG. 2 or the system 101 in FIG. 3. The system 900 includes a transmitter (Tx) device 910 and a receiver (Rx) device 920 coupled to each other by a transmission network 980. The transmission network 980 may be a wired and/or wireless network; e.g., the Internet. Referring also to FIGS. 1, 2, and 3, the Tx device 910 includes the first stage circuit 110, and the Rx device 920 includes the second stage circuit 120 and the booster engine 250 or 350. In one embodiment, the Tx device 910 and the Rx device 920 may be any two endpoints in a transmission path of the frame sequence. As a non-limiting example, the Tx device 910 may be a cloud server, from which the Rx device 920 may download a frame sequence (e.g., a video). The quality of the frame sequence generated by the Tx device 910 and received by the Rx device 920 may be uneven in that the FPS and resolution of the frames may dynamically change due to unstable transmission bandwidth. The booster engine 950 can stabilize the frame quality at the receiver end according to the aforementioned operations in connection with FIGS. 2-6.

The operations of the flow diagram of FIG. 6 have been described with reference to the exemplary embodiments of FIGS. 2, 3, and 7-9. However, it should be understood that the operations of the flow diagram of FIG. 6 can be performed by embodiments of the invention other than the embodiments of FIGS. 2, 3, and 7-9, and the embodiments of FIGS. 2, 3, and 7-9 can perform operations different than those discussed with reference to the flow diagram. While the flow diagram of FIG. 6 shows a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general-purpose circuits, which operate under the control of one or more processors and coded instructions), which will typically comprise transistors that are configured in such a way as to control the operation of the circuitry in accordance with the functions and operations described herein. For example, the image guidance module 110, the parameter decision module 130, and the SR engine 140 of FIG. 1 may be functional blocks implemented through either dedicated circuits or general-purpose circuits.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for enhancing quality of a frame sequence, comprising:
    adjusting, by a first stage circuit, quality degradation of the frame sequence when a condition in constrained resources is detected, the quality degradation including at least one of uneven resolution and uneven frame per second (FPS);
    receiving, by a booster engine, the frame sequence from the first stage circuit; and
    generating, by the booster engine, an enhanced frame sequence based on the frame sequence for transmission to a second stage circuit.

2. The method of claim 1, wherein the constrained resources include one or more of computational resources, power resources, and transmission bandwidth.

3. The method of claim 1, wherein generating the enhanced frame sequence further comprises:
    calculating an optical flow for a current frame using a frame preceding the current frame as a reference frame.

4. The method of claim 1, wherein generating the enhanced frame sequence further comprises:
    calculating an optical flow for a current frame using a previous frame having better quality than a quality threshold as a reference frame.

5. The method of claim 1, wherein adjusting the quality degradation further comprises:
    dynamically changing frame quality during frame sequence generation in response to resource constraints.

6. The method of claim 1, further comprising:
    activating the booster engine by sending a help request from the first stage circuit to the booster engine, the help request indicating the quality degradation in the plurality of frames; and
    performing, by the booster engine in response to the help request, image alignment between a current frame and a reference frame, and frame quality optimization including at least super-resolution and inpainting.

7. The method of claim 1, further comprising:
    detecting, by the booster engine, the quality degradation in a current frame; and
    performing, by the booster engine, image alignment between the current frame and a reference frame, and frame quality optimization including at least super-resolution and inpainting.

8. The method of claim 1, further comprising:
    optimizing, by the booster engine, quality of a received frame in the frame sequence;
    comparing, by the booster engine, the optimized quality with a threshold; and
    reverting back to the quality of the received frame when the optimized quality is below the threshold.

9. The method of claim 1, wherein the first stage circuit, the booster engine, and the second stage circuit are located within a same electronic device.

10. The method of claim 1, wherein the first stage circuit and the second stage circuit are in two electronic devices coupled to each other by a transmission network.

11. A system operative to enhance quality of a frame sequence, comprising:
- a first stage circuit to adjust quality degradation of the frame sequence when a condition in constrained resources is detected, the quality degradation including at least one of uneven resolution and uneven frame per second (FPS); and
- a booster engine to receive the frame sequence from the first stage circuit, and to generate an enhanced frame sequence based on the frame sequence for transmission to a second stage circuit.

12. The system of claim 11, wherein the constrained resources include one or more of computational resources, power resources, and transmission bandwidth.

13. The system of claim 11, wherein the booster engine is further operative to calculate an optical flow for a current frame using a frame preceding the current frame as a reference frame.

14. The system of claim 11, wherein the booster engine is further operative to calculate an optical flow for a current frame using a previous frame having better quality than a quality threshold as a reference frame.

15. The system of claim 11, wherein the first stage circuit is further operative to dynamically change frame quality during frame sequence generation in response to resource constraints.

16. The system of claim 11, wherein the first stage circuit is further operative to activate the booster engine by sending a help request that indicates the quality degradation in the plurality of frames, and the booster engine in response to the help request is operative to perform image alignment between a current frame and a reference frame, and frame quality optimization including at least super-resolution and inpainting.

17. The system of claim 11, wherein the booster engine is further operative to detect the quality degradation in a current frame, and perform image alignment between the current frame and a reference frame, and frame quality optimization including at least super-resolution and inpainting.

18. The system of claim 11, wherein the booster engine is further operative to:
- optimize quality of a received frame in the frame sequence;
- compare the optimized quality with a threshold; and
- revert back to the quality of the received frame when the optimized quality is below the threshold.

19. The system of claim 11, wherein the first stage circuit, the booster engine, and the second stage circuit are located within a same electronic device.

20. The system of claim 11, wherein the first stage circuit and the second stage circuit are in two electronic devices coupled to each other by a transmission network.

* * * * *